United States Patent Office 2,867,624
Patented Jan. 6, 1959

2,867,624
BIS-ARYLTRIAZOLE COMPOUNDS

Norman L. Anderson, Hamburg, N. Y., assignor to Allied Chemical & Dye Corporation, New York, N. Y., a corporation of New York No Drawing. Application March 23, 1956
Serial No. 573,311

10 Claims. (Cl. 260—308)

This invention relates to bis-aryltriazole compounds. It relates more particularly to new bis-aryltriazole compounds which are substantially white in appearance when viewed in white lacking ultraviolet radiation, and are excited by ultraviolet radiation to show a high degree of bluish-green to bluish-violet fluorescence.

The primary object of the invention is to provide a new group of chemical compounds of said class having a combination of properties which render said compounds especially useful as so-called "optical bleaches" or whitening and brightening agents particularly in the laundering of cellulosic materials, such as cotton, linen, regenerated cellulose, etc.

Other objects will in part be obvious and in part will appear hereinafter.

A number of chemical compounds are known which, although they are of diverse chemical structure, have the property of giving off a blue fluorescence when exposed to ultraviolet rays, such as daylight or light rich in ultraviolet. Some of them are sufficiently soluble in water and sufficiently resistant to the alkaline action of soap to be capable of use as additives for soaps and other compositions used in laundering clothes and linens, whereby they impart a bluish fluorescence to the laundered goods which has the effect of whitening the appearance of white goods and brightening the appearance of colored goods. Certain of said compounds are substantive to cellulosic fibers, that is, they are taken up from their solutions and held by cellulosic fibers, similarly to direct cotton dyestuffs.

Few of them, however, possess a combination of these and other properties in the desired balance to be useful commercially for the addition to soaps, laundering compositions, detergents, wetting agents, and the like. Thus, while some possess certain of the desired properties they are unstable in aqueous solution against the destructive action of the chemical bleaching agents commonly employed, such as alkali metal hypochlorites, alkali earth metal hypochlorites, alkali metal perborate, hydrogen peroxide, and the like.

According to the present invention, a new group of chemical compounds is provided having such a combination of the said desired properties as to make them especially suitable for use as "optical bleaches" and for other purposes. The compounds of the present invention are chromophore-free bis-aryltriazoles having 1 to 6 sulfo groups in the molecule in which two nitrogen atoms of each aryltriazole radical are linked to a pair of adjacent nuclear carbon atoms of the aryltriazole radical and each aryltriazole radical is linked thru its external nitrogen atom (the other nitrogen atom) to a nuclear carbon atom of a different one of a pair of mononuclear aryl radicals forming part of a benzanilide radical. (As employed here, the term "sulfo" denotes generically the compounds in the form of their free sulfonic acids and in the form of their metal, ammonium and organic base salts.)

They include compounds in which the aryltriazole radicals are like or different mononuclear or polynuclear (including condensed polynuclear) aryl radicals in which one or more of the nuclear hydrogen atoms are replaced by sulfo groups and/or other atoms or simple radicals which do not impart color to the molecule; such as, halogen (e. g., chlorine or bromine), amino, acylamido, carboxy, alkyl and alkoxy, especially containing up to 5 carbon atoms (e. g., methyl, ethyl, propyl, butyl, methoxy, ethoxy, propoxy, butoxy, and amoxy). The benzanilide radical may be any of the various anilides or substituted anilides of benzoic acid and substituted benzoic acids in which the hydrogen atoms of the nucleus are replaced by another atom or a simple radical which does not impart color to the molecule; such as those referred to above. Thus they include the radicals derived from p,p'-Diamino-benzanilide
m,m'-Diamino-benzanilide
p,m'-Diamino-benzanilide
p,p'-Diamino-m-methoxy-benzanilide
p,p'-Diamino-m-chloro-benzanilide
p,p'-Diamino-o'-sulfobenzanilide (The ring attached to the N—i. e. the anilide—is designated by prime letters in keeping with the usual naming of benzanilides.)

Those which are derived from p,p'-diaminobenzanilide are of particular value in view of their bluish fluorescence when exposed to ultra-violet rays, good substantivity to cellulosic fibers, such as cotton, viscose and paper, and outstanding fastness to washing and bleaching, e. g. with hypochlorite and peroxides.

Such compounds, in the form of the free sulfonic acids, are represented by the formula

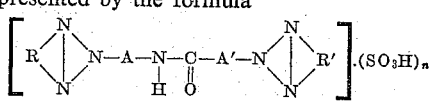

wherein:

R and R' are like or different mononuclear aryl (i. e., of the benzene series) or polynuclear aryl, including condensed polynuclear aryl (especially of the naphthalene series), radicals which are bound by two adjacent nuclear carbon atoms (ortho-carbon atoms) to two nitrogen atoms of the triazole radical, A and A' are like or different phenylene radicals, R, R', A and A' are free from further substituents or may be substituted by one or more halogen atoms and/or alkyl, alkoxy, amino, acylamido, carboxy and/or sulfo groups, and n is a whole number from 1 to 6, inclusive.

I have discovered that the compounds of the above class possess a combination of desirable properties which render them especially useful as members of the family of "optical bleaches." Thus, they are slightly colored substances which per se and in solutions or on fibers or substrates produce a blue-green to blue-violet fluorescence (between 4000 and 4950 angstron units) to a high degree under the influence of ultra-violet radiation, e. g., between 2260 and 4045 angstron units. They are sufficiently substantive to cellulosic materials to impart to such materials the property of emanating a bluish fluorescence when excited by ultraviolet radiation; so that they are therefore valuable "optical bleaches," particularly useful in laundering compositions and processes, and adapted to enhance the "whiteness" as well as brilliancy of colors of household cellulosic materials, such as towels, tablecloths, napkins, sheets, pillow cases, shirts and the like. Yet they do not cause an undesirable accumulation of substantive deposits or decomposition products in or on such materials leading to staining of the materials when such cellulose fabrics are laundered repeatedly in solutions which contain a compound of the present invention at a concentration normally used in such washings.

A surprising property of all of the compounds of this invention is their unexpected stability towards the bleaching or oxidizing action of the bleaching agents commonly used in ordinary commercial and household laundering processes applied to household linens and cellulosic white and colored goods, such as alkali metal hypochlorite, alkaline earth metal hypochlorite, alkali metal perborate, hydrogen peroxide and the like, when used at the usual concentrations applied in such processes. I have found that the degree of fluoresence imparted to cellulosic material by treatment with a solution of a compound of the invention is not substantially altered by treatment with such bleaches.

In the form of their alkali metal, ammonium, alkylamine and alkylolamine salts, the compounds of the present invention are soluble to a limited extent in water to form solutions which are compatible with the usual detergents and wetting agents normally used in commercial and household laundering. They lend themselves readily to uniform incorporation into commercial laundering compositions in the form of cakes, powders and solutions, containing cleaning agents such as soaps, ionic detergents (such as, alkylaryl sulfonates and alkyl sulfates) and non-ionic detergents (such as the polymerization products derived from ethylene and propylene oxides).

For general laundering purposes, aqueous solutions which contain up to about 1000 p. p. m. of compound based on the weight of fabric, are effective to impart distinctive brightening and whitening effects, but usually a concentration ranging from about 10 to about 100 p. p. m. is sufficient for most commercial and household laundry washings.

The bis-aryltriazoles of the present invention can be prepared in various ways. Ordinarily they can be prepared by oxidizing the corresponding ortho-amino-azo compounds by means of suitable oxidizing agents, similarly to the methods used in manufacturing triazole dyestuffs, e. g., by heating with ammoniacal copper sulfate or with sodium hypochlorite.

The parent ortho-amino-azo compounds can be prepared by coupling one mol of a suitable tetrazotized diaminobenzanilide in acid medium, preferably having a pH between about 4.5 and 6, with 2 mols of an aromatic amine, preferably of the benzene or naphthalene series, which has a free position ortho to the amino group and which couples in said position.

Alternatively, they may be prepared by the following sequence of steps:
(a) Coupling one mol of a suitable diazotized nitroaniline with one mol of an aromatic amine which couples in ortho-position to the amino group,
(b) Converting the ortho amino azo compound to the nitroaryltriazole, e. g., with ammoniacal cupric sulfate,
(c) Reducing the nitroaryltriazole to the corresponding amine,
(d) Condensing the aminoaryltriazole with a suitable nitrobenzoyl halide,
(e) Reducing the nitrobenzamidoaryltriazole to the corresponding amine,
(f) Diazotizing and coupling the resulting aminobenzamidoaryltriazole with one mol of a suitable aromatic amine which couples in ortho-position to the amino group, and
(g) Converting the o-aminoazotriazole thus obtained to the corresponding bis-aryltriazole.

This alternative method is particularly suitable for the preparation of bis-aryltriazole compounds wherein R and R' (as well as A and A'), as defined in the general formula, are unlike radicals.

The invention will be illustrated by the following specific examples, but it is to be understood that the invention is not limited to their details and that changes may be made without departing from its scope. The temperatures are in degrees centigrade and the parts are by weight.

Example 1

Part 1.—A mixture of 22.7 parts of p,p'-diaminobenzanilide, 200 parts of water and 58 parts of 20° Bé. hydrochloric acid was agitated and cooled to 0° with ice, and the diamine was then tetrazotized by adding a solution of 14.2 parts of sodium nitrite in 40 parts of water over a period of a few minutes and agitating the mass for 2 hours. Thereafter a small amount of sulfamic acid (sufficient to destroy the excess nitrous acid) was added and the tetrazo solution was stirred into a cold (0°) slurry of 76 parts of 2-amino-naphthalene-5,7-disulfonic acid, 400 parts of water, 20 parts of 2-naphthalene-sulfonic acid (which serves as a coupling assistant), and sufficient sodium carbonate and sodium hydroxide to make the whole neutral (pH 6 to 7.5). To the agitated reaction mixture a solution of 40 parts of sodium acetate in 200 parts of water was then added slowly over a period of one hour. Thereafter the coupling mass was made alkaline to Brilliant Yellow paper by addition of sodium carbonate, the disazo compound resulting from the coupling was recovered in the form of a filter-cake by adding 90 parts of common salt, to precipitate the disazo compound, and filtering the mass. The disazo compound corresponds to the formula

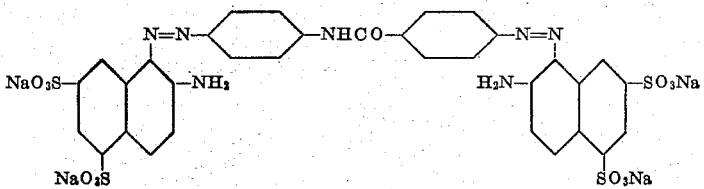

Part 2.—The filter-cake obtained in part 1 was dissolved in 1600 parts of water at 80°, then a solution of 100 parts of copper sulfate pentahydrate, 200 parts of water, 116 parts of 30% ammonia solution, and 40 parts of morpholine were added to the hot aqueous mass. The resulting mixture was refluxed for 18 hours, to effect oxidation of the disazo compound to the corresponding bis-triazole compound which was precipitated and recovered by adding 326 parts of sodium chloride to the hot reaction mixture, cooling, and filtering off the precipitated bis-triazole compound. The filter-cake was air dried.

The dry product was p,p'-bis(5,7-disulfo-1,2-naphthotriazole-)benzanilide in the form of the tetrasodium salt, having the formula

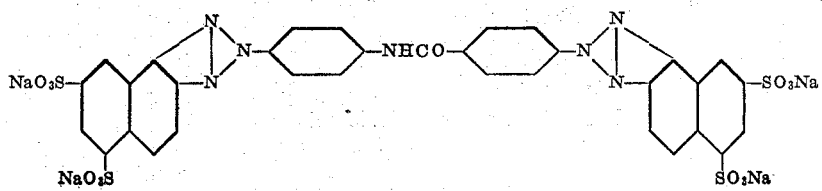

It was a light tan powder, which dissolved in water to yield colorless solutions. The product when applied to cellulosic fibers imparted a bluish fluorescence thereto in ultra-violet light.

Example 2

*Part 1.*—A tetrazo solution, prepared as described in Example 1, part 1, from 22.7 parts of p,p'-diaminobenzanilide, was added with stirring to a cold (0°) slurry of 48 parts of 2-amino-naphthalene-5-sulfonic acid, 40 parts of water, 20 parts of 2-naphthalenesulfonic acid, and sufficient sodium carbonate to make the whole about neutral (pH 6 to 7.5). Then 40 parts of sodium acetate dissolved in 200 parts of water were added to the coupling mass, which was then agitated for 16 hours. The resulting disazo compound was precipitated and recovered as a filter-cake by heating the reaction mixture to 70°; adding 90 parts of sodium chloride, cooling the resulting slurry to room temperature, and filtering.

*Part 2.*—The filter-cake obtained in part 1 was oxidized to the corresponding bis-triazole compound which was precipitated and recovered in the manner set out in Example 1, part 2.

The dry product was p,p'-bis(5-sulfo-1,2-naphthotriazole-)benzanilide, in the form of the disodium salt, having the formula

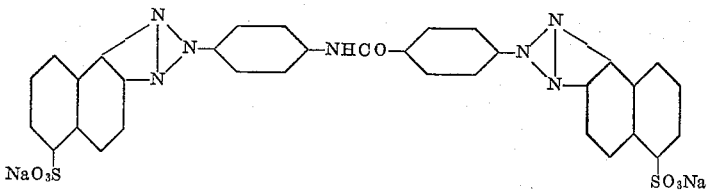

It was a pale yellow powder, soluble in water to yield colorless solutions. Cellulosic fibers treated with the aqueous product showed a bluish fluorescence under ultra-violet light.

By employing 1-aminonaphthalene-4-sulfonic acid in place of 2-aminonaphthalene-5-sulfonic acid in the foregoing example, a product possessing similar properties was obtained.

Example 3

*Part 1.*—A tetrazo solution, prepared as described in Example 1, part 1, from 30.7 parts of p,p'-diamino-o'-sulfobenzanilide, was added to a cold slurry of 27.4 parts of 1-amino-3-methoxy-4-methylbenzene, 20 parts of 20° Bé. hydrochloric acid, 40 parts of water and 20 parts of 2-naphthalenesulfonic acid. Then a solution of 40 parts of sodium acetate in 200 parts of water was added to the coupling mixture, which was agitated at 10° for 16 hours. The disazo compound was then salted out and filtered off.

*Part 2.*—The product obtained as a filter cake in part 1 was oxidized to the corresponding bis-triazole compound, which was precipitated and recovered in the manner set out in Example 1, part 2.

The dry product was p,p'-bis(4-methyl-5-methoxy-1,2-benzotriazole-)-o'-sulfobenzanilide in the form of the sodium salt, having the formula:

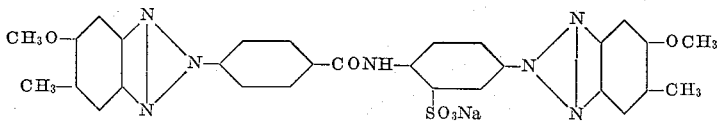

It was a light tan powder, soluble in water to yield colorless solutions. Cellulosic fibers dyed with this product showed a bluish fluorescence in ultra-violet light.

It will be realized by those skilled in the art that the invention is not limited to the above specific examples and that changes can be made without departing from the scope of the invention.

Thus, in the examples, 2-amino-naphthalene-5,7-disulfonic acid and 2-amino-naphthalene-5-sulfonic acid may be replaced by equivalent quantities of other suitable aromatic amino compounds defined above, with due regard in selecting the components that the final product contains in its molecule at least one and not more than six sulfo groups; such as 2-aminonaphthalene, 1-aminonaphthalene-5-sulfonic acid, 1-aminonaphthalene-4,6-disulfonic acid, 1-aminonaphthalene-4,7-disulfonic acid, 1-aminonaphthalene-4,8-disulfonic acid, 1-aminonaphthalene-3,6-disulfonic acid, m-phenylenediamine, and 1,3-diaminobenzene-4-sulfonic acid.

I claim:

1. A bis-aryltriazole having 1 to 6 sulfo groups and, in the free acid form, corresponding to the formula

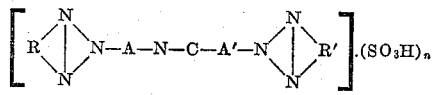

wherein:

R and R' are selected from the group consisting of radicals of benzene and naphthalene and their lower alkyl and lower alkoxy derivatives, which radicals are each bound by two adjacent carbon atoms to two nitrogen atoms of the triazole radical, A and A' are selected from the group consisting of radicals of benzene and its lower alkyl and lower alkoxy derivatives, and n is a whole number from 1 to 6.

2. A bis-naphthotriazole in which two nitrogen atoms of each naphthotriazole radical are linked to a pair of adjacent nuclear carbon atoms of the naphthotriazole radical and each naphthotriazole radical is linked through its other nitrogen atom to a nuclear carbon atom of a different one of a pair of benzene nuclei forming part of a benzanilide radical, said bis-naphthotriazole having 1 to 6 sulfo groups in the molecule as sole nuclear substituents.

3. A bis-naphthotriazole as defined in claim 2 in which each naphthotriazole radical is a 1,2-naphthotriazole radical having a sulfo group at least in the 5-position of the naphthalene nucleus.

4. A bis-naphthotriazole as defined in claim 2, in which each naphthotriazole radical is the 5,7-disulfo-1,2-naphthotriazole radical.

5. A bis-naphthotriazole as defined in claim 2, in which the naphthotriazole radicals are linked to the benzanilide radical in the p,p'-positions relative to the amido group.

6. A bisnaphthotriazole as defined in claim 5, in which each naphthotriazole radical is the 5,7-disulfo-1,2-naphthotriazole radical.

7. A bis-naphthotriazole as defined in claim 5 in which the sulfo groups are in the form of their alkali metal salts.

8. A bis-naphthotriazole as defined in claim 7 in which the sulfo groups are in the form of their sodium salts.

9. A bis-naphthotriazole as defined in claim 2, in which the sulfo groups are in the form of their sodium salts.

10. A bis-naphthotriazole corresponding to the formula
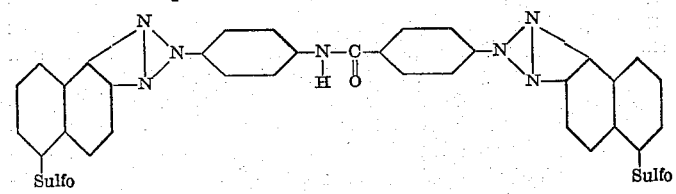
References Cited in the file of this patent
UNITED STATES PATENTS
2,141,707    Ebel ------------------ Dec. 27, 1938
FOREIGN PATENTS
499,494    Canada --------------- Jan. 26, 1954

UNITED STATES PATENT OFFICE
Certificate of Correction

Patent No. 2,867,624            January 6, 1959

Norman L. Anderson

It is hereby certified that error appears in the above numbered patent requiring correction and that the said Letters Patent should read as corrected below.

In the grant, lines 2 and 12, and in the heading to the printed specification, lines 3 and 4, name of assignee, for "Allied Chemical & Dye Corporation" read —Allied Chemical Corporation—; in the printed specification, column 2, line 56, for "angstron" read —angstrom—; column 6, lines 16 to 18, inclusive, claim 1, the central portion of the formula should appear as shown below instead of as in the patent—

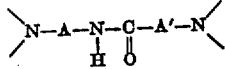

Signed and sealed this 30th day of June 1959.

[SEAL]

Attest:
KARL H. AXLINE,
Attesting Officer.

ROBERT C. WATSON,
Commissioner of Patents.